United States Patent
Oda et al.

(10) Patent No.: US 9,044,807 B2
(45) Date of Patent: Jun. 2, 2015

(54) CENTRIFUGALLY CAST COMPOSITE ROLL AND ITS PRODUCTION METHOD

(71) Applicant: HITACHI METALS, LTD., Minato-ku, Tokyo (JP)

(72) Inventors: Nozomu Oda, Kitakyusyu (JP); Takayuki Segawa, Kitakyusyu (JP); Yasunori Nozaki, Yasugi (JP); Toshiyuki Hattori, Kitakyusyu (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 14/365,528

(22) PCT Filed: Mar. 28, 2013

(86) PCT No.: PCT/JP2013/059228
§ 371 (c)(1),
(2) Date: Jun. 13, 2014

(87) PCT Pub. No.: WO2013/150950
PCT Pub. Date: Oct. 10, 2013

(65) Prior Publication Data
US 2014/0377587 A1 Dec. 25, 2014

(30) Foreign Application Priority Data

Apr. 2, 2012 (JP) .................................. 2012-083562

(51) Int. Cl.
*B22D 13/02* (2006.01)
*B21B 27/00* (2006.01)
(Continued)

(52) U.S. Cl.
CPC ....... *B22D 13/026* (2013.01); *Y10T 428/12958* (2015.01); *B22D 13/02* (2013.01);
(Continued)

(58) Field of Classification Search
CPC .... B22D 13/02; B22D 13/023; B22D 13/026; B22D 19/16; B22D 27/04; B22D 27/045; B21B 2267/24; B21B 27/032; B21B 27/03; B21B 27/00; B21B 2203/18; C22C 37/08; C22C 37/10; C22C 37/00; C22C 38/44; C22C 38/40; C22C 38/36; C22C 38/08; C22C 38/24; C22C 38/04; C22C 38/02; C22C 38/06; Y10T 428/12958
USPC .............................................. 492/1, 2, 54, 58
See application file for complete search history.

(56) References Cited

U.S. PATENT DOCUMENTS 2,710,997 A * 6/1955 Krepps ........................ 164/67.1
3,659,323 A * 5/1972 Hachisu et al. ............ 29/895.32
(Continued)

FOREIGN PATENT DOCUMENTS

JP 58-157202 U 10/1983
JP 59-225806 A 12/1984
(Continued)

OTHER PUBLICATIONS

International Search Report for PCT/JP2013/059228 dated Jul. 2, 2013.

*Primary Examiner* — David Bryant
*Assistant Examiner* — Jason L Vaughan
(74) *Attorney, Agent, or Firm* — Sughrue Mion, PLLC

(57) ABSTRACT

A centrifugally cast composite roll comprising an outer layer formed by a centrifugal casting method, and an inner layer made of ductile cast iron and integrally fused to the outer layer; the outer layer being made of an Fe-based alloy having a chemical composition comprising by mass at least 0.8-3.0% of Cr, 1.5-6.0% of Mo, and 1.8-5.5% of V, and a metal structure in which the area ratio of graphite is 0.3-10%; the inner layer comprising a roll body portion fused to the outer layer, and shaft portions integrally extending from both ends of the roll body portion; and the total amount of Cr, Mo and V being 0.15-2.0% by mass in end portions of both shaft portions, and the difference in the total amount of Cr, Mo and V between one shaft portion and the other shaft portion being 0.2% or more by mass.

6 Claims, 3 Drawing Sheets

(51) Int. Cl.
*C22C 37/00* (2006.01)
*C22C 37/06* (2006.01)
*B21B 27/03* (2006.01)
*B32B 15/01* (2006.01)
*C22C 37/08* (2006.01)
*C22C 37/10* (2006.01)
*B22D 19/16* (2006.01)

(52) U.S. Cl.
CPC ............... *B21B 27/00* (2013.01); *C22C 37/00* (2013.01); *C22C 37/06* (2013.01); *B21B 27/032* (2013.01); *B32B 15/011* (2013.01); *C22C 37/08* (2013.01); *C22C 37/10* (2013.01); *B22D 13/023* (2013.01); *B22D 19/16* (2013.01)

(56) References Cited

U.S. PATENT DOCUMENTS

| | | | |
|---|---|---|---|
| 4,000,010 A | * | 12/1976 | Sekimoto et al. ............ 148/524 |
| 4,484,959 A | * | 11/1984 | Boucher et al. ............ 148/524 |
| 5,305,522 A | * | 4/1994 | Nawata et al. ............ 29/895.32 |
| 5,355,932 A | * | 10/1994 | Nawata et al. ............ 164/95 |
| 5,674,171 A | * | 10/1997 | Ichino et al. ............ 492/3 |
| 8,156,651 B2 | * | 4/2012 | Furushima et al. ........ 29/895.32 |
| 8,328,703 B2 | * | 12/2012 | Boccalini et al. ........ 492/3 |

FOREIGN PATENT DOCUMENTS

| | | |
|---|---|---|
| JP | 06-304612 A | 11/1994 |
| JP | 2003-073767 A | 3/2003 |
| JP | 2005-177809 A | 7/2005 |
| JP | 2012-213780 A | 11/2012 |

\* cited by examiner

CENTRIFUGALLY CAST COMPOSITE ROLL AND ITS PRODUCTION METHOD

CROSS REFERENCE TO RELATED APPLICATIONS

This application is a National Stage of International Application No. PCT/JP2013/059228 filed Mar. 28, 2013 (claiming priority based on Japanese Patent Application No. 2012-083562, filed Apr. 2, 2012), the contents of which are incorporated herein by reference in their entirety.

FIELD OF THE INVENTION

The present invention relates to a centrifugally cast composite roll having a composite structure comprising an outer layer formed by a centrifugal casting method and a tough inner layer fused to the outer layer, and its production method.

BACKGROUND OF THE INVENTION

As shown in FIGS. 1 and 2, a hot-rolling composite roll 10 comprises an outer layer 1 coming into contact with a sheet to be rolled, and an inner layer 2 fused to an inner surface of the outer layer 1 and made of a different material from that of the outer layer 1. The inner layer 2 comprises a roll body portion 21 fused to the outer layer 1, and a driver-side shaft portion 22 and a follower-side shaft portion 23 integrally extending from both ends of the roll body portion 21. An end portion of the driver-side shaft portion 22 is integrally provided with a clutch portion 24 for conveying a driving torque. An end portion of the follower-side shaft portion 23 is integrally provided with a projection 25 necessary for handling the composite roll 10, etc. The clutch portion 24 has an end surface 24a and a pair of flat notch surfaces 24b, 24b engaging a driving means (not shown), and the projection 25 has an end surface 25a. The driver-side shaft portion 22 and the follower-side shaft portion 23 should be machined to have bearing portions, neck portions, etc.

Widely used as such a hot-rolling composite roll 10 is a composite roll having a composite structure comprising a centrifugally cast outer layer 1 having excellent wear resistance and failure resistance, and an inner layer 2 made of tough ductile cast iron and integrally fused to the outer layer 1. When damages such as wear and surface roughening, etc. occur in a surface layer of the outer layer 1 of the hot-rolling roll 10 by a thermal and mechanical load due to contact with a sheet to be rolled, a rolled sheet has poor surface quality. A composite roll 10 suffering large wear and surface roughening is exchanged to a composite roll 10 free from damages on an outer layer surface, and the outer layer 1 of the composite roll 10 taken out of a mill is re-polished to remove damages. The re-polished composite roll 10 is assembled in the mill again to be used for rolling. The frequent exchange of the composite rolls 10 results in frequent interruption of rolling, resulting in low productivity.

To make the frequency of the interruption of rolling as low as possible, attempts have been made to improve the wear resistance of the outer layer 1 coming into contact with a sheet to be rolled. As the wear resistance of the outer layer 1 has been improved to provide the composite roll 10 with a longer durable life, it has become important to improve the wear resistance of the clutch portion 24 coming into contact with a torque-conveying coupling. Extreme wear of the clutch portion 24 would make the composite roll 10 usable, even if the outer layer 1 were not worn.

As a hot-rolling composite roll comprising a clutch portion with improved wear resistance, JP 6-304612 A discloses a hot-rolling composite roll comprising an outer layer made of high-speed tool steel, and an inner layer and a shaft portion made of carbon steel containing 0.2-1.2% by weight of C or low-alloyed steel, a clutch portion made of spheroidal graphite cast iron comprising by weight 2.5-3.5% of C; 1.6-2.8% of Si, 0.3-0.6% of Mn, P<0.05%, S<0.03%, Ni<0.5%, Cr<0.2%, Mo<0.5%, and 0.02-0.05% of Mg, the balance being Fe and other inevitable components, and an area ratio of graphite being 5-15%, being integrally connected to an end of the shaft portion by casting. However, this clutch portion still has insufficient wear resistance. In addition, the end-to-end casting connection of the clutch portion to the shaft portion causes such a problem that foreign matter, etc. are likely introduced into an interface therebetween, resulting in casting defects. Further needed are flat cutting of casting-connected portions, setting a mold around portions to be casting-connected, and the melting and casting steps of spheroidal graphite cast iron for the clutch portion different from the inner layer, resulting in a higher production cost.

There is a further problem that if the driver-side shaft portion 22 and the follower-side shaft portion 23 were formed by the same hard material, the follower-side shaft portion 23 not required to be as hard as the driver-side shaft portion 22 would be unnecessarily hard, resulting in poor machinability.

Object of the Invention

Accordingly, an object of the present invention is to provide a centrifugally cast composite roll having improved attrition resistance in the driver-side shaft portion while maintaining the machinability of the follower-side shaft portion, and its production method.

Disclosure of the Invention

As a result of intensive research in view of the above object, the inventors have found that (a) after the formation of the outer layer by a centrifugal casting method, large amounts of Cr, Mo and V, or Cr, Mo, V and Nb in the outer layer can be transferred more into the driver-side shaft portion than into the follower-side shaft portion by properly controlling the elevating speed of a melt surface for the inner layer cast in the stationary mold, thereby making the driver-side shaft portion harder than the follower-side shaft portion, and that (b) the driver-side shaft portion has high hardness with excellent attrition resistance, while the follower-side shaft portion is not too hard, resulting in good machinability. The present invention has been completed based on such findings.

The first centrifugally cast composite roll of the present invention comprises an outer layer formed by a centrifugal casting method, and an inner layer made of ductile cast iron and integrally fused to the outer layer;

the outer layer being made of an Fe-based alloy having a chemical composition comprising by mass at least 0.8-3.0% of Cr, 1.5-6.0% of Mo, and 1.8-5.5% of V, and a metal structure in which the area ratio of graphite is 0.3-10%;

the inner layer comprising a roll body portion fused to the outer layer, and shaft portions integrally extending from both ends of the roll body portion; and the total amount of Cr, Mo and V being 0.15-2.0% by mass in end portions of both shaft portions, and the difference in the total amount of Cr, Mo and V between one shaft portion and the other shaft portion being 0.2% or more by mass.

In the first centrifugally cast composite roll, the outer layer preferably further comprises by mass 2.5-3.7% of C, 1.2-3.0% of Si, 0.2-1.5% of Mn, and 3.0-5.0% of Ni.

The second centrifugally cast composite roll of the present invention comprises an outer layer formed by a centrifugal casting method, and an inner layer made of ductile cast iron and integrally fused to the outer layer;

the outer layer being made of Fe-based alloy having a chemical composition comprising by mass at least 0.8-3.0% of Cr, 1.5-6.0% of Mo, and 1.8-5.5% in total of V and Nb, and a metal structure in which the area ratio of graphite is 0.3-10%;

the inner layer comprising a roll body portion fused to the outer layer, and shaft portions integrally extending from both ends of the roll body portion; and the total amount of Cr, Mo, V and Nb being 0.15-2.0% by mass in end portions of both shaft portions, and the difference in the total amount of Cr, Mo, V and Nb between one shaft portion and the other shaft portion being 0.2% or more by mass.

In the second centrifugally cast composite roll, the outer layer preferably further comprises by mass 2.5-3.7% of C, 1.2-3.0% of Si, 0.2-1.5% of Mn, and 3.0-5.0% of Ni.

In the first and second centrifugally cast composite rolls, the outer layer may further contain by mass at least one of 0.1-5.0% of W, 0.003-5.0% of Ti, 0.001-0.5% of B, 0.01-2.0% of Al, 0.01-0.5% of Zr, and 0.1-10% of Co.

The method of the present invention for producing a centrifugally cast composite roll comprises the steps of (1) centrifugally casting the outer layer in a rotating, centrifugal-casting, cylindrical mold; (2) erecting the cylindrical mold containing the outer layer upright, and attaching upper and lower molds communicating with the outer layer to upper and lower ends of the cylindrical mold to constitute an assembled stationary mold; and (3) casting a melt for the inner layer into a cavity defined by the upper mold, the outer layer and the lower mold; the elevating speed of a melt surface in the upper mold being 100 mm/second or less, smaller than the elevating speed of a melt surface in the lower mold and the outer layer.

DESCRIPTION OF THE PREFERRED EMBODIMENTS

The embodiments of the present invention will be explained in detail below without intention of restricting the present invention thereto, and various modifications may be made within a scope of the present invention. Unless otherwise mentioned, the mere description of "%" means "% by mass."

Figure 1:
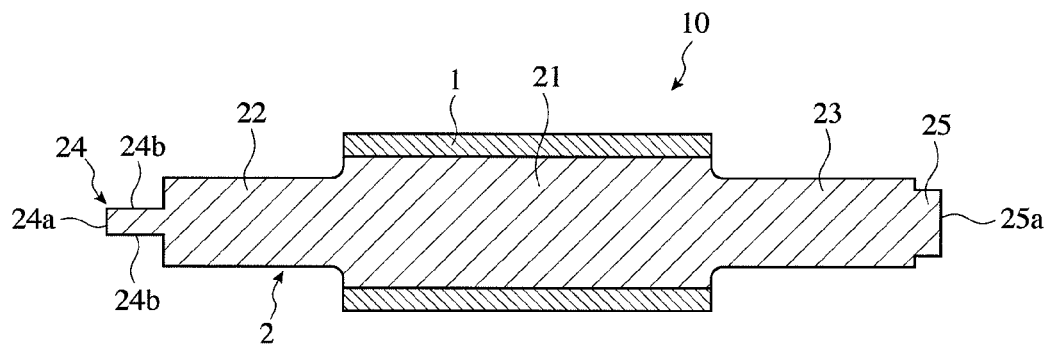
FIG. 1 is a schematic cross-sectional view showing a hot-rolling composite roll.

Any of the first and second centrifugally cast composite rolls of the present invention has the structure shown in FIG. 1. The first centrifugally cast composite roll differs from the second centrifugally cast composite roll only in the composition of the outer layer. Namely, the outer layer of the first centrifugally cast composite roll comprises V, while the outer layer of the second centrifugally cast composite roll comprises (V+Nb). Thus, the outer layer composition of the first centrifugally cast composite roll will be explained first, and the above difference will then be explained with respect to the outer layer composition of the second centrifugally cast composite roll.

[1] Centrifugally Cast Composite Roll (A) Outer Layer (1) Outer Layer Composition of First Centrifugally Cast Composite Roll The outer layer of the first centrifugally cast composite roll is made of an Fe-based alloy having a chemical composition comprising by mass at least 0.8-3.0% of Cr, 1.5-6.0% of Mo, and 1.8-5.5% of V, and a metal structure in which the area ratio of graphite is 0.3-10%. This outer layer preferably further comprises by mass 2.5-3.7% of C, 1.2-3.0% of Si, 0.2-1.5% of Mn, and 3.0-5.0% of Ni.

(a) Cr: 0.8-3.0% by Mass

Cr is an element effective for turning the matrix to bainite or martensite for hardness, thereby holding wear resistance. When Cr is less than 0.8% by mass, a sufficient amount of Cr is not dissolved in the inner layer, providing the clutch portion with insufficient attrition resistance. On the other hand, more than 3.0% by mass of Cr hinders the precipitation of graphite, providing the matrix structure with low toughness. The upper limit of the Cr content is preferably 2.5% by mass, more preferably 2.1% by mass.

(b) Mo: 1.5-6.0% by Mass

Mo is combined with C to form hard carbides ($M_6C$, $M_2C$), thereby providing the outer layer with improved hardness, and improving the hardenability of the matrix. Also, Mo forms tough and hard MC carbides together with V and Nb, improving wear resistance. In addition, Mo increases the specific gravity of the remaining eutectic melt in the solidification process of the alloy melt, prevents the centrifugal separation of a primary γ-phase, and suppresses the generation of speck-like segregated dendrites of bainite and/or martensite. When Mo is less than 1.5% by mass, a sufficient amount of Mo is not dissolved in the inner layer, providing the clutch portion with insufficient attrition resistance. On the other hand, more than 6.0% by mass of Mo deteriorates the toughness of the outer layer, and tends to cause white solidification, thereby preventing the precipitation of graphite. The lower limit of the Mo content is preferably 2.0% by mass, more preferably 2.5% by mass, most preferably 3.0% by mass. The upper limit of the Mo content is preferably 5.5% by mass, more preferably 5.0% by mass, most preferably 4.5% by mass.

(c) V: 1.8-5.5% by Mass

V is an element combined with C to form hard MC carbides. The MC carbides have Vickers hardness Hv of 2500-3000, hardest among the carbides. When V is less than 1.8% by mass, an insufficient amount of MC carbides are precipitated, and an insufficient amount of V is dissolved in the inner layer, providing the clutch portion with insufficient attrition resistance. On the other hand, when V exceeds 5.5% by mass, the MC carbides having a small specific gravity are concentrated in an inside portion of the outer layer by a centrifugal force during centrifugal casting, resulting in the extreme radial segregation of MC carbides, and the MC carbides become coarser, resulting in a coarser alloy structure, and thus larger surface roughening by rolling. The lower limit of the V content is preferably 2.0% by mass, more preferably 2.2% by mass, most preferably 2.4% by mass. The upper limit of the V content is preferably 5.0% by mass, more preferably 4.5% by mass, most preferably 4.0% by mass.

(d) Total Amount of Cr, Mo and V

The total amount of Cr, Mo and V in end portions of both shaft portions is 0.15-2.0% by mass, and the difference in the total amount of Cr, Mo and V between one shaft portion and the other shaft portion is 0.2% or more by mass. With the amounts of Cr, Mo and V in the outer layer set to 0.8-3.0% of Cr, 1.5-6.0% of Mo and 1.8-5.5% of V, and with the casting conditions of ductile cast iron for the inner layer adjusted, particular amounts of carbide-forming elements such as Cr, Mo and V in the outer layer are transferred into the inner layer, thereby causing the solid solution strengthening of the matrix structure of the shaft portions made of the inner layer material, and forming carbides to harden the shaft portions. When the total amount of Cr, Mo and V in end portions of both shaft portions is less than 0.15% by mass, the clutch portions have insufficient attrition resistance. When the total amount of Cr, Mo and V exceeds 2.0% by mass, excessive carbides are formed, resulting in brittle shaft portions which are likely broken. The total amount of Cr, Mo and V in end portions of both shaft portions is more preferably 0.2-1.8% by mass. The amounts of Cr, Mo and V in end portions of the shaft portions are measured by chemical analysis on each sample taken out of an end surface of the shaft portion or a portion within 100 mm longitudinally from the end surface of the shaft portion. The shaft portions may further contain at least one of 0.1-1.0% of Cu, 0.03-0.1% of P, 0.5-2.5% of Ni, and 0.5-1.5% of Mn, for improved wear resistance, etc.

The difference in the total amount of Cr, Mo and V between an end portion of one shaft portion and an end portion of the other shaft portion is 0.2% or more by mass. When a shaft portion having a larger total amount of Cr, Mo and V in an end portion, namely a shaft portion in which larger amounts of Cr, Mo and V, carbide-forming elements, are transferred from the outer layer into the inner layer, is used as a driver-side shaft portion with a clutch portion, the clutch portion can have high attrition resistance. Oppositely, when a shaft portion having a smaller total amount of Cr, Mo and V in an end portion, namely a shaft portion in which smaller amounts of Cr, Mo and V, carbide-forming elements, are transferred from the outer layer into the inner layer, is used as a follower-side shaft portion without a clutch portion, the follower-side shaft portion is less harder than the driver-side shaft portion and thus more easily machined than the driver-side shaft portion. The difference in the total amount of Cr, Mo and V between an end portion of one shaft portion and an end portion of the other shaft portion is more preferably 0.25% or more by mass.

(2) Outer Layer Composition of Second Centrifugally Cast Composite Roll

The outer layer of the second centrifugally cast composite roll is made of an Fe-based alloy having a chemical composition comprising by mass at least 0.8-3.0% of Cr, 1.5-6.0% of Mo, and 1.8-5.5% in total of V and Nb (excluding a case where Nb is 0%), and a metal structure in which the area ratio of graphite is 0.3-10%. This outer layer preferably further comprises by mass 2.5-3.7% of C, 1.2-3.0% of Si, 0.2-1.5% of Mn, and 3.0-5.0% of Ni. Only difference in the outer layer chemical composition between the first and second centrifugally cast composite rolls is that the latter has the total amount of V and Nb. Accordingly, only the total amount of V and Nb will be explained in detail below.

(a) V and Nb: 1.8-5.5% by Mass in Total

Like V, Nb is also combined with C to form hard MC carbides. Nb added with V and Mo is dissolved in MC carbides to strengthen them, thereby improving the wear resistance of the outer layer. MC-type NbC contributes to reducing the segregation of MC carbides, because the MC-type NbC is closer to the melt than MC-type VC in density. Further, Nb increases the specific gravity of the remaining eutectic melt in the solidification process of the alloy melt, preventing the centrifugal separation of a primary γ-phase, and suppressing the speck-like segregation of dendrite-shaped bainite and/or martensite transformed from austenite. When the total amount of V and Nb is less than 1.8% by mass, insufficient amounts of V and Nb are dissolved in the inner layer, providing the clutch portion with insufficient attrition resistance. On the other hand, more than 5.5% by mass in total of V and Nb strongly tend to cause white solidification, thereby preventing the precipitation of graphite.

The lower limit of the total amount of V and Nb is preferably 2.0% by mass, more preferably 2.2% by mass, most preferably 2.4% by mass. The upper limit of the V content is preferably 5.0% by mass, more preferably 4.5% by mass, most preferably 4.0% by mass. Particularly, the lower limit of the Nb content is preferably 0.2% by mass, more preferably 0.3% by mass, most preferably 0.5% by mass. The upper limit of the Nb content is preferably 1.5% by mass, more preferably 1.3% by mass, most preferably 1.2% by mass.

(3) Common Composition for Outer Layers of First and Second Centrifugally Cast Composite Rolls (a) C: 2.5-3.7% by Mass C is combined with V, Nb, Cr, Mo and W to form hard carbides, contributing to improving the wear resistance of the outer layer. Also, it is precipitated as graphite in the structure by graphitization-promoting elements such as Si, Ni and Ti, providing the outer layer with high seizure resistance and improved toughness. When C is less than 2.5% by mass, an insufficient amount of graphite is precipitated, and too small amounts of hard carbides are precipitated, failing to provide the outer layer with sufficient wear resistance. Further, when C is less than 2.5% by mass, austenite moves toward outside by a centrifugal force, so that carbon tends to be concentrated in the melt inside the outer layer, because there is large temperature difference between the crystallization of austenite and the crystallization of eutectic carbides. As a result, coarse dendrites of austenite are likely formed and grow in the carbon-concentrated melt. Dendrites of austenite are transformed to bainite and/or martensite, resulting in coarse speck-like segregation.

On the other hand, when C exceeds 3.7% by mass, too much graphite with a string-like shape is precipitated, lowering the strength of the outer layer. Also, excessive carbides lower the toughness of the outer layer, resulting in low cracking resistance, generating deeper rolling cracks, and increasing roll loss. The lower limit of the C content is preferably 2.55% by mass, more preferably 2.65% by mass. The upper limit of the C content is preferably 3.6% by mass, more preferably 3.5% by mass, most preferably 3.4% by mass.

(b) Si: 1.2-3.0% by Mass

Si deoxidizes the melt to reduce oxide defects, and promotes the precipitation of graphite, contributing to improving seizure resistance and suppressing the propagation of cracks. When Si is less than 1.2% by mass, the melt is insufficiently deoxidized, and insufficient graphite is formed. On the other hand, when Si exceeds 3.0% by mass, the alloy matrix becomes brittle, providing the outer layer with low toughness.

The embrittlement of the alloy matrix occurs, particularly when the concentration of Si in the matrix becomes 3.2% or more by mass.

The lower limit of the Si content is preferably 1.4% by mass, more preferably 1.5% by mass. The upper limit of the Si content is preferably 2.8% by mass, more preferably 2.7% by mass, most preferably 2.5% by mass. The Si content preferably meets the condition of the formula (1) described later, together with other elements.

(c) Mn: 0.2-1.5% by Mass

Mn deoxidizes the melt and fixes S, an impurity, as MnS. When Mn is less than 0.2% by mass, these effects are insufficient. On the other hand, even when Mn exceeds 1.5% by mass, further effects cannot be obtained. The lower limit of the Mn content is preferably 0.3% by mass, more preferably 0.4% by mass, most preferably 0.5% by mass. The upper limit of the Mn content is preferably 1.4% by mass, more preferably 1.3% by mass, most preferably 1.2% by mass.

(d) Ni: 3.0-5.0% by Mass

Ni functions to precipitate graphite, improving the hardenability of the matrix structure. Accordingly, by adjusting a cooling speed in the mold after casting, transformation to bainite or martensite can occur without transformation to pearlite. When Ni is less than 3.0% by mass, its function is insufficient. On the other hand, when Ni exceeds 5.0% by mass, austenite becomes too stable, making transformation to bainite or martensite unlikely. The lower limit of the Ni content is preferably 3.2% by mass, more preferably 3.4% by mass, most preferably 3.6% by mass. The upper limit of the Ni content is preferably 4.9% by mass, more preferably 4.8% by mass, most preferably 4.7% by mass.

(4) Optional Composition

In addition to the above indispensable composition requirements, the outer layer of the centrifugally cast composite roll of the present invention may contain at least one of the following elements.

(a) W: 0.1-5.0% by Mass

W is combined with C to form hard carbides of $M_6C$ and $M_2C$, contributing to improving the wear resistance of the outer layer. W is also dissolved in MC carbides to increase their specific gravities, thereby reducing segregation. However, more than 5.0% by mass of W increases the specific gravity of the melt, making the segregation of carbides likely. Accordingly, when W is added, its content is preferably 5.0% or less by mass. On the other hand, when W is less than 0.1% by mass, its effect is insufficient. The upper limit of the W content is preferably 4.5% by mass, more preferably 4.0% by mass, most preferably 3.0% by mass. To obtain sufficient effects, the lower limit of the W content is more preferably 0.1% by mass.

(b) Mo and W: 1.5-6.0% by Mass in Total

Like Mo, W is combined with C to form hard carbides ($M_6C$, $M_2C$), thereby increasing the hardness of the outer layer and the hardenability of the matrix. Also, Mo and W form tough and hard MC carbides together with V and Nb, improving wear resistance. In addition, Mo and W increase the specific gravity of the remaining eutectic melt in the solidification process of the alloy melt, preventing the centrifugal separation of a primary γ-phase, and suppressing the speck-like segregation of dendrites of bainite and/or martensite.

When the total amount of Mo and W is less than 1.5% by mass, insufficient amounts of Mo and W are dissolved in the inner layer, providing the clutch portion with insufficient attrition resistance. On the other hand, when the total amount of Mo and W exceeds 6.0% by mass, the outer layer has deteriorated toughness, and white solidification tends to occur, hindering the precipitation of graphite. The lower limit of the total amount of Mo and W is preferably 2.0% by mass, more preferably 2.5% by mass, most preferably 3.0% by mass. The upper limit of the total amount of Mo and W is preferably 5.5% by mass, more preferably 5.0% by mass, most preferably 4.5% by mass.

(c) Ti: 0.003-5.0% by Mass

Ti is combined with N and O, graphitization-preventing elements, to form its oxide or nitride. The oxide or nitride of Ti is dispersed as nuclei in the melt, making MC carbides finer and more uniform. However, when Ti exceeds 5.0% by mass, the melt has an increased viscosity, likely generating casting defects. Accordingly, when Ti is added, its content is preferably 5.0% or less by mass. On the other hand, when Ti is less than 0.003% by mass, sufficient effects cannot be obtained. The lower limit of the Ti content is preferably 0.005% by mass. The upper limit of the Ti content is more preferably 3.0% by mass, most preferably 1.0% by mass.

(d) Al: 0.01-2.0% by Mass

Al is combined with N and O, graphitization-preventing elements, to form its oxide or nitride, which is dispersed as nuclei in the melt for the precipitation of fine, uniform MC carbides. However, when Al exceeds 2.0% by mass, the outer layer becomes brittle, resulting in deteriorated mechanical properties. Accordingly, the Al content is preferably 0.2% or less by mass. On the other hand, when Al is less than 0.01% by mass, sufficient effects cannot be obtained. The upper limit of the Al content is more preferably 1.5% by mass, most preferably 1.0% by mass.

(e) Zr: 0.01-0.5% by Mass

Zr is combined with C to form MC carbides, improving the wear resistance of the outer layer. Zr oxide formed in the melt functions as crystal nuclei, making the solidified structure fine. Also, it increases the specific gravity of MC carbides, preventing their segregation. However, when Zr exceeds 0.5% by mass, inclusions are undesirably formed. Accordingly, Zr is preferably 0.5% or less by mass. On the other hand, when Zr is less than 0.01% by mass, sufficient effects cannot be obtained. The upper limit of the Zr content is preferably 0.3% by mass, more preferably 0.2% by mass, most preferably 0.1% by mass.

(f) B: 0.001-0.5% by Mass

B functions to make carbides finer. Also, a trace amount of B contributes to the precipitation of graphite. However, when B exceeds 0.5% by mass, white solidification tends to occur, making the precipitation of graphite unlikely. Accordingly, the B content is preferably 0.5% or less by mass. On the other hand, when B is less than 0.001% by mass, sufficient effects cannot be obtained. The upper limit of the B content is preferably 0.3% by mass, more preferably 0.1% by mass, most preferably 0.05% by mass.

(g) Co: 0.1-10.0% by Mass

Co is an element effective for strengthening the matrix structure. Co also makes the precipitation of graphite easier. However, when Co exceeds 10% by mass, the outer layer has reduced toughness. Accordingly, the Co content is preferably 10% or less by mass. On the other hand, when Co is less than 0.1% by mass, sufficient effects cannot be obtained. The upper limit of the Co content is preferably 8.0% by mass, more preferably 6.0% by mass, most preferably 4.0% by mass.

(5) Preferable Compositional Relations (a) Nb/V: 0.1-0.7, Mo/V: 0.7-2.5, and V+1.2 Nb: 2.5-5.5

Because any of V, Nb and Mo has a function to increase hard MC carbides indispensable for wear resistance, the total amount of these elements should be above a predetermined level. Also, V is an element decreasing the specific gravity of the melt, while Nb and Mo are elements increasing the specific gravity of the melt. Accordingly, without a good balance of V with Nb and Mo, there would be large difference in specific gravity between the melt and austenite. Thus, austenite moves toward the outer layer side by a centrifugal force, so that carbon is extremely concentrated, making the segregation of dendrites of austenite likely.

Accordingly, a mass ratio of Nb/V is 0.1-0.7, a mass ratio of Mo/V is 0.7-2.5, and V+1.2 Nb is 2.5-5.5% by mass. With Nb/V, Mo/V and V+1.2 Nb in these ranges, proper amounts of Nb and Mo are contained in V-based carbides to make them heavy, resulting in uniform dispersion of carbides, and thus preventing the speck-like segregation of dendrites of bainite and/or martensite. Particularly, when V+1.2 Nb exceeds 5.5%, excessively precipitated MC carbides having a small specific gravity are concentrated in an inside portion of the outer layer in the centrifugal casting process, hindering fusion to the inner layer.

The lower limit of the mass ratio of Nb/V is preferably 0.12, more preferably 0.14, most preferably 0.18. The upper limit of the mass ratio of Nb/V is preferably 0.6, more preferably 0.55, most preferably 0.5.

The lower limit of the mass ratio of Mo/V is preferably 0.75, more preferably 0.8, most preferably 0.85. The upper limit of the mass ratio of Mo/V is preferably 2.2, more preferably 1.95, most preferably 1.75.

The lower limit of V+1.2 Nb is preferably 2.6% by mass, more preferably 2.7% by mass, most preferably 2.8% by mass. The upper limit of V+1.2 Nb is preferably 5.35% by mass, more preferably 5.2% by mass, most preferably 5.0% by mass.

(b) Mo/Cr: 1.7-5.0

A mass ratio of Mo/Cr is preferably in a range of 1.7-5.0. When the mass ratio of Mo/Cr is less than 1.7, the Mo content is not sufficient relative to the Cr content, resulting in a reduced area ratio of Mo-based carbide particles. On the other hand, when the mass ratio of Mo/Cr is more than 5.0, too large an amount of Mo-based carbides are formed, resulting in coarser carbides, and thus poor fracture toughness. Accordingly, the mass ratio of Mo/Cr is preferably 1.7-5.0. The lower limit of the mass ratio of Mo/Cr is more preferably 1.8. The upper limit of the mass ratio of Mo/Cr is more preferably 4.7, most preferably 4.5.

$$(c) Si \leq 3.2/[0.283(C-0.2 V-0.13 Nb)+0.62] \quad (1)$$

Figure 5:
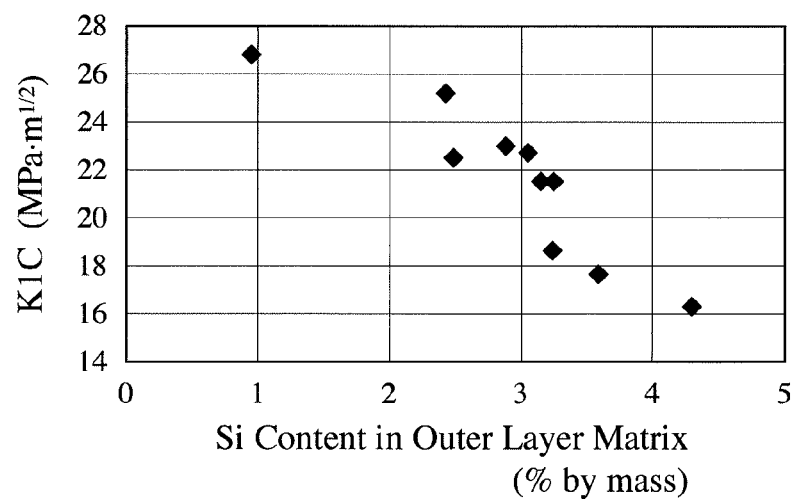
FIG. 5 is a graph showing the relation between the amount of Si dissolved in the outer layer matrix and fracture toughness (K1C).

To improve the failure resistance, the outer layer of the roll should have fracture toughness of 18.5 MPa·m$^{1/2}$ or more, for example when used as a work roll in downstream stands in a hot strip mill. To this end, the matrix should have sufficient toughness. Intensive research has revealed that the fracture toughness of the matrix drastically decreases when the amount of Si dissolved in the matrix exceeds 3.2%. FIG. 5 shows the relation between the amount of Si dissolved in the matrix and fracture toughness. The fracture toughness is substantially 22 MPa·m$^{1/2}$ or more when the amount of Si dissolved in a solid solution is 3.2% or less, but reduced to 18.5 MPa·m$^{1/2}$ or less when the amount of Si exceeds 3.2%. Intensive research with respect to the alloy composition restricting the amount of Si dissolved in the matrix has revealed that the condition of Si≤3.2/[0.283 (C−0.2 V−0.13 Nb)+0.62] should be met to dissolve 3.2% or less of Si in the matrix.

$$(d)(C-0.2 V-0.13 Nb)+(Cr+Mo+0.5 W) \leq 9.5 \quad (2)$$

In the solidification process of cast iron containing V, Nb, Cr, Mo and W, granular MC carbides of V and Nb are first precipitated, and Cr, Mo and W are then concentrated in a liquid phase to precipitate network-shaped eutectic carbides of $M_2C$, $M_6C$, $M_7C_3$, $M_{23}C_6$, $M_3C$, etc. The fracture toughness of the outer layer largely depends on the amount and shape of carbides. Particularly when large amounts of network-shaped eutectic carbides are formed, or when they are coarse, the fracture toughness decreases extremely. When C is excessive relative to V and Nb forming MC carbides, and when excessive Cr, Mo and W are concentrated in a liquid phase in the solidification process, coarse carbides are formed, providing the outer layer with low fracture toughness. Whether C is excessive or not relative to V and Nb is judged by the term of (C−0.2 V−0.13 Nb), and whether Cr, Mo and W are excessive or not is judged by the term of (Cr+Mo+0.5 W). Intensive research has revealed that the composition condition for preventing decrease in the fracture toughness is to meet (C−0.2 V−0.13 Nb)+(Cr+Mo+0.5 W)≤9.5. To obtain fracture toughness of 18.5 MPa·m$^{1/2}$ or more, the left-side value should be 9.5 or less.

$$(e) 1.5 \leq Mo+0.5 W \leq 5.5 \quad (3)$$

Mo and W have a function to form hard carbides of $M_2C$ or $M_6C$. Because the function of Mo is twice as much as that of W, the total amount of Mo and W can be expressed by (Mo+0.5 W). To from carbides of $M_2C$ and $M_6C$ to improve wear resistance, (Mo+0.5 W) should be 1.5% or more by mass. However, because too much (Mo+0.5 W) would form large amounts of network-shaped eutectic carbides, (Mo+0.5 W) should be 5.5% or less by mass.

(6) Outer Layer Structures of First and Second Centrifugally Cast Composite Rolls In any of the first and second centrifugally cast composite rolls, the structure of the outer layer comprises a matrix, graphite, cementite, MC carbides, and other carbides ($M_2C$, $M_6C$, etc.) than MC carbides. In any of the first and second centrifugally cast composite rolls, the area ratio of graphite in the metal structure of the outer layer is 0.3-10%. When the area ratio of graphite is less than 0.3%, the outer layer has insufficient wear resistance and seizure resistance. On the other hand, when the area ratio of graphite exceeds 10%, the outer layer has extremely deteriorated mechanical properties. The area ratio of graphite is preferably 0.5-8%, more preferably 1-7%.

(B) Inner Layer (1) Distribution of Carbide-Forming Elements

Figure 2:
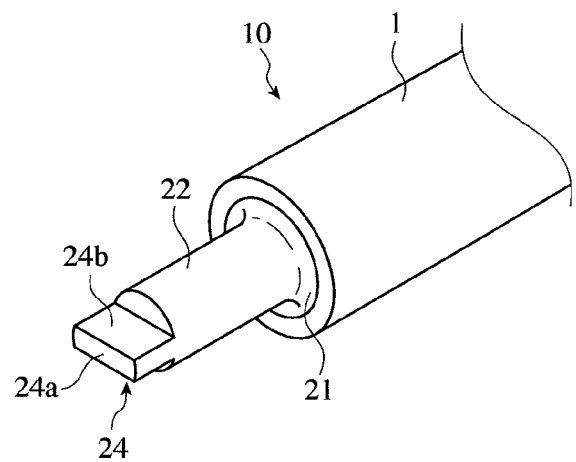
FIG. 2 is a partial perspective view showing the clutch portion side of the hot-rolling composite roll of FIG. 1.

As shown in FIGS. 1 and 2, the inner layer 2 comprises a roll body portion 21 fused to the outer layer 1, and a driver-side shaft portion 22 and a follower-side shaft portion 23 integrally extending from both ends of the roll body portion 21. In the case of the first centrifugally cast composite roll, the diffusion of "Cr, Mo, V and Nb" from the outer layer 1 to the inner layer 2 means the diffusion of "Cr, Mo and V," because the Nb content is zero. The first and second centrifugally cast composite rolls are thus summarily called the centrifugally cast composite roll of the present invention in the following explanations.

In the production of the centrifugally cast composite roll of the present invention, when a ductile-cast-iron melt for the inner layer 2 is cast under predetermined casting conditions during or after the solidification of the outer layer formed by a centrifugal casting method, the inner surface of the outer layer 1 is re-molten, so that carbide-forming elements (Cr, Mo, V and Nb) are transferred into the inner layer 2 in predetermined proportions. As a result, the matrix structures of the driver-side shaft portion 22 and the follower-side shaft portion 23 are solid-solution-strengthened, and provided with high hardness by the formation of carbides. In the present invention, the total amount of Cr, Mo and V should be 0.15-2.0% by mass in end portions of both driver-side shaft portion 22 and follower-side shaft portion 23, and the difference in the total amount of Cr, Mo and V between the driver-side shaft portion 22 on one side and the follower-side shaft portion 23 on the other side should be 0.2% or more by mass. The term "end portion of the driver-side shaft portion 22" means a range within 100 mm from the end surface 24a, and the term "end portion of the follower-side shaft portion 23 means a range within 100 mm from the end surface 25a. Samples taken out of the driver-side shaft portion 22 and the follower-side shaft portion 23 within the above ranges are subject to chemical analysis to determine the amounts of Cr, Mo, V and the Nb.

When the total amount of Cr, Mo, V and Nb is less than 0.15% by mass in end portions of both shaft portions 22, 23, the clutch portion 24 has insufficient attrition resistance. On the other hand, when the total amount of Cr, Mo, V and Nb exceeds 2.0% by mass, too large amounts of carbides are formed, making both shaft portions 22, 23 brittle. The total amount of Cr, Mo, V and Nb is more preferably 0.2-1.8% by mass in end portions of both shaft portions 22, 23.

The difference in the total amount of Cr, Mo, V and Nb between the end portion of one shaft portion and the end portion of the other shaft portion is 0.2% or more by mass. When a shaft portion having a larger total amount of Cr, Mo, V and Nb (larger amounts of carbide-forming elements migrate from the outer layer 1 to the inner layer 2) is used as a driver-side shaft portion 22 with a clutch portion 24, the clutch portion 24 has high attrition resistance. Also, when a shaft portion having a smaller total amount of Cr, Mo, V and Nb (smaller amounts of carbide-forming elements migrate from the outer layer 1 to the inner layer 2) is used as a follower-side shaft portion 23, the follower-side shaft portion 23 is softer than the driver-side shaft portion 22, and so easily machined. The above total amount difference is preferably 0.25% or more by mass.

(2) Composition of Ductile Cast Iron for Inner Layer

In the composite roll as a final product, ductile cast iron for the inner layer comprises by mass 2.3-3.6% of C, 1.5-3.5% of Si, 0.2-2.0% of Mn, and 0.3-2.0% of Ni, in addition to Cr, Mo, V and Nb described above. Apart from these elements, it may contain 0.1% or less of Al as a deoxidizer, 0.5% or less of Cu, Sn, As or Sb for improving hardness, and 0.2% or less of B, Ca, Na or Zr coming from flux or refractory materials. It may also contain about 0.1% or less in total of S, P, N and O as impurities. The preferred chemical composition of ductile cast iron for the inner layer comprises by mass 2.3-3.6% of C, 1.5-3.5% of Si, 0.2-2.0% of Mn, 0.3-2.0% of Ni, 0.05-1.0% of Cr, 0.05-1.0% of Mo, 0-0.7% of W, 0.05-1.0% of V, and 0-0.7% of Nb, and 0.01-0.08% of Mg, the balance being substantially Fe and inevitable impurities.

(C) Intermediate Layer

Though the present invention utilizes the migration of Cr, Mo, V and Nb from the outer layer 1 into the driver-side shaft portion 22 and the follower-side shaft portion 23 during the casting of the inner layer 2, an intermediate layer may be formed between the outer layer 1 and the inner layer 2, if necessary. The preferred chemical composition of the intermediate layer comprises by mass 2.3-3.6% of C, 0.7-3.5% of Si, 0.2-2.0% of Mn, 0.5-5.0% of Ni, 0.8-3.0% of Cr, 0.1-3.0% of Mo, 0-3.0% of W, 0.1-3.0% of V, and 0-3.0% of Nb, the balance being substantially Fe and inevitable impurities.

When a melt for the intermediate layer is cast, an inner surface portion of the outer layer 1 is re-molten and mixed into the intermediate layer, so that Cr, Mo, V and Nb migrate into the intermediate layer. Because an inner surface portion of the intermediate layer is re-molten during casting the inner layer 2, Cr, Mo, V and Nb migrating from the outer layer 1 to the intermediate layer also migrate into the inner layer. Accordingly, the effect of the present invention can be obtained even when the intermediate layer is formed. To secure the migration of Cr, Mo, V and Nb from the outer layer 1 to the inner layer 2, the intermediate layer has an average thickness of preferably 1-70 mm, more preferably 3-50 mm.

[2] Production Method of Centrifugally Cast Composite Roll

Figure 3A:
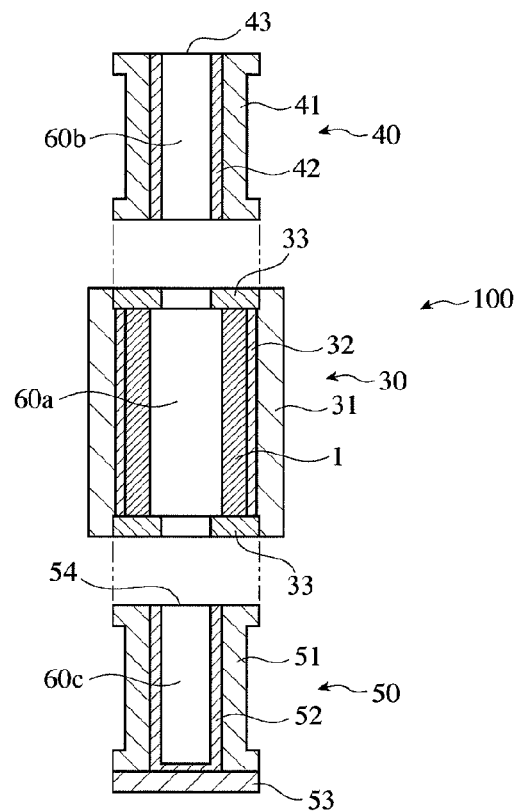
FIG. 3(a) is an exploded cross-sectional view showing an example of molds used for producing the centrifugally cast composite roll of the present invention.
Figure 3B:
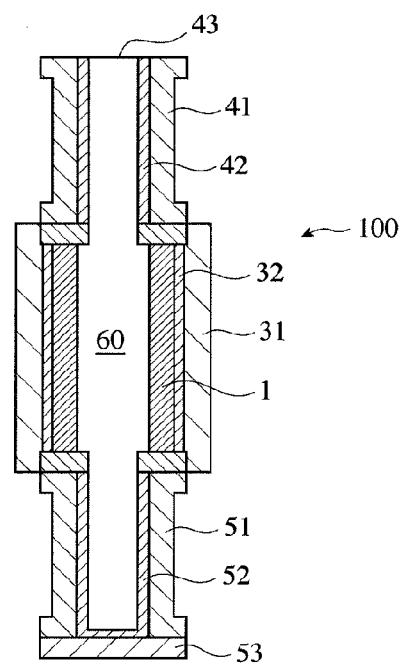
FIG. 3(b) is a cross-sectional view showing an example of molds used for producing the centrifugally cast composite roll of the present invention.

FIGS. 3(a) and 3(b) show an example of assembled stationary molds used for casting the inner layer 2 after centrifugally casting the outer layer 1 in the centrifugal-casting, cylindrical mold 30. The assembled stationary mold 100 comprises a cylindrical mold 30 containing the outer layer 1 on the inner surface, and an upper mold 40 and a lower mold 50 attached to upper and lower ends of the cylindrical mold 30. An inner surface of the outer layer 1 in the cylindrical mold 30 comprises a cavity 60a for forming the roll body portion 21 of the inner layer 2, the upper mold 40 comprises a cavity 60b for forming the follower-side shaft portion 23 of the inner layer 2, and the lower mold 50 comprises a cavity 60c for forming the driver-side shaft portion 22 of the inner layer 2. The centrifugal casting method may be a horizontal, inclined or vertical type.

With the upper mold 40 and the lower mold 50 assembled on and under the cylindrical mold 30, the cavity 60a in the outer layer 1 has communication with the cavity 60b in the upper mold 40 and the cavity 60c in the lower mold 50, constituting a cavity 60 for integrally forming the entire inner layer 1. Portions 31 and 33 in the cylindrical mold 30 are sand molds. A portion 42 in the upper mold 40 and a portion 52 in the lower mold 50 are also sand molds. The lower mold 50 is provided with a bottom plate 53 for holding the inner layer melt.

As shown in FIGS. 3(a) and 3(b), the cylindrical mold 30 containing the centrifugally cast outer layer 1 is vertically disposed on the lower mold 50 for forming the driver-side shaft portion 22, and the upper mold 40 for forming the follower-side shaft portion 23 is disposed on the cylindrical mold 30, thereby constituting an assembled stationary mold 100 for forming the inner layer 2.

In the assembled stationary mold 100, during or after the solidification of the outer layer formed by a centrifugal casting method, as a ductile-cast-iron melt for the inner layer 2 is poured into the cavity 60 through an upper opening 43 of the upper mold 40, a melt surface in the cavity 60 is gradually elevated from the lower mold 50 to the upper mold 40, so that the inner layer 2 constituted by the driver-side shaft portion 22, the roll body portion 21 and the follower-side shaft portion 23 is integrally cast. In this process, an inner surface portion of the outer layer 1 is re-molten by heat of the melt, so that Cr, Mo, V and Nb in the outer layer 1 are transferred into the inner layer 2.

In the method of the present invention, the elevating speed of a melt surface in the upper mold 40 for forming the follower-side shaft portion 23 is 100 mm/second or less, and smaller than the elevating speed of a melt surface in the lower mold 50 for forming the driver-side shaft portion 22 and the cylindrical mold 30 (outer layer 1) for forming the roll body portion 21. Thus, Cr, Mo, V and Nb migrating from the outer layer 1 re-molten by pouring a melt to a level of the roll body portion 21 reside in the driver-side shaft portion 22 and the roll body portion 21 longer, so that they are suppressed from migrating into the follower-side shaft portion 23 formed in the upper mold 40.

When the elevating speed of a melt surface in the upper mold 40 exceeds 100 mm/second, the melt is stirred when poured, so that a melt in the lower mold 50 and the cylindrical mold 30 is mixed with a melt in the upper mold 40. As a result, larger amounts of Cr, Mo, V and Nb migrate from the driver-side shaft portion 22 and the roll body portion 21 into the follower-side shaft portion 23. The elevating speed of a melt surface in the upper mold 40 is preferably 10-100 mm/second, more preferably 20-90 mm/second.

With the elevating speed of a melt surface in the upper mold 40 being 100 mm/second or less, and smaller than the elevating speed of a melt surface in the lower mold 50 and the elevating speed of a melt surface in the cylindrical mold 30 (outer layer 1), Cr, Mo, V and Nb in the outer layer 1 can efficiently be mixed into the driver-side shaft portion 22 and the roll body portion 21, and Cr, Mo, V and Nb mixed into the driver-side shaft portion 22 and the roll body portion 21 are effectively suppressed from being re-mixed into the follower-side shaft portion 23 due to the stirring of the melt. The elevating speed of a melt surface in the upper mold 40 is preferably less than the elevating speed of a melt surface in the lower mold 50 and the elevating speed of a melt surface in the cylindrical mold 30 (outer layer 1) by 50-150 mm/second. Though not particularly restricted, the elevating speed of a melt surface in the lower mold 50 and the elevating speed of a melt surface in the cylindrical mold 30 (outer layer 1) are preferably 100-200 mm/second for practical purposes, unless casting is hindered. The elevating speed of a melt surface in the lower mold 50 may be equal to or higher than that in the cylindrical mold 30 (outer layer 1). It should be noted that any of the elevating speed of a melt surface in the upper mold 40, the elevating speed of a melt surface in the lower mold 50, and the elevating speed of a melt surface in the cylindrical mold 30 (outer layer 1) is an average elevating speed.

As described above, the amounts of Cr, Mo, V and Nb migrating into the driver-side shaft portion 22 and the follower-side shaft portion 23 can be controlled, not only by adjusting the amounts of Cr, Mo, V and the Nb contained in the outer layer 1, but also by adjusting the elevating speed of a melt surface in the upper mold 40, the elevating speed of a melt surface in the lower mold 50 and the elevating speed of a melt surface in the cylindrical mold 30 (outer layer 1). Specifically, the total amount of Cr, Mo, V and Nb in an end portion of the driver-side shaft portion 22 formed in the lower mold 50 having a larger elevating speed of a melt surface is more than the total amount of Cr, Mo, V and Nb in an end portion of the follower-side shaft portion 23 formed in the upper mold 40, with difference of 0.2% or more by mass. Accordingly, the clutch portion 24 formed in an end portion of the driver-side shaft portion 22 can have high attrition resistance. On the other hand, the follower-side shaft portion 23 with a smaller total amount of Cr, Mo, V and Nb is more machinable than the driver-side shaft portion 22.

In the present invention, there is optimally difference in the amounts of Cr, Mo, V and the Nb between one shaft portion and the other shaft portion, particularly the above difference in the amounts of the elements is set such that the driver-side shaft portion is higher in hardness than the follower-side shaft portion. However, the follower-side shaft portion may be higher in hardness than the driver-side shaft portion depending on the applications and required performance of rolls.

Figure 4:
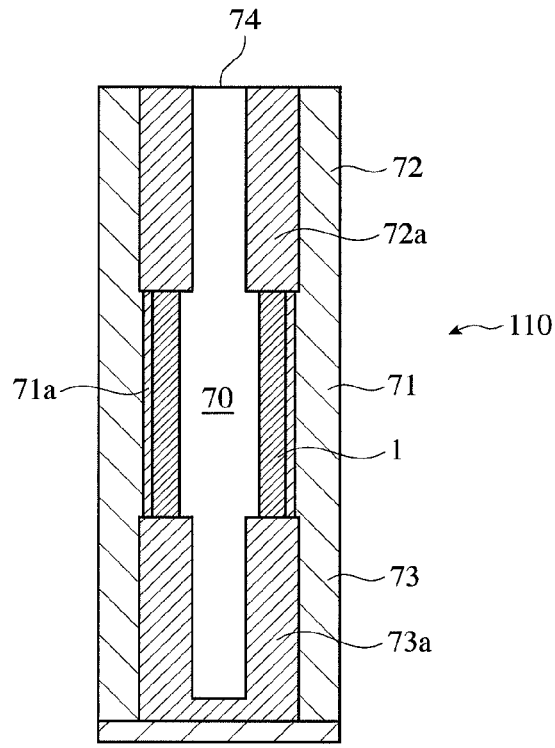
FIG. 4 is a cross-sectional view showing another example of molds used for producing the centrifugally cast composite roll of the present invention.

FIG. 4 shows another example of molds used in the method of the present invention. This mold 110 is a mold integrally comprising a portion 71 corresponding to the cylindrical mold 30 for forming the outer layer 1 and the roll body portion 21, a portion 72 corresponding to the upper mold 40 for forming the follower-side shaft portion 23, and a portion 73 corresponding to the lower mold 50 for forming the driver-side shaft portion 22. Incidentally, 71a, 72a, 73a represent sand molds. Thus, the mold 110 has both functions as a centrifugal mold and an assembled stationary mold. After centrifugally casting the outer layer 1 by the mold 110, the overall mold 110 containing the outer layer 1 in an inner surface is erected upright, and a ductile-cast-iron melt for the inner layer 2 is then poured thereinto through an upper opening 74.

When the intermediate layer is formed, what is erected upright after the intermediate layer is formed on the inner surface of the outer layer 1 is the cylindrical mold 30 in the case of the mold shown in FIG. 3, and the mold 110 in the case of the mold shown in FIG. 4. A ductile-cast-iron melt for the inner layer 2 is then poured into the mold through an upper opening.

The present invention will be explained in more detail referring to Examples below without intention of restricting the present invention thereto.

Examples 1-3, and Comparative Examples 1 and 2

A cylindrical mold 30 (inner diameter: 800 mm, and length: 2500 mm) having the structure shown in FIG. 3(a) was assembled in a horizontal centrifugal casting machine, and each melt having the composition shown in Table 1 was centrifugally cast to form an outer layer 1. After the solidification of the outer layer 1, the cylindrical mold 30 containing the outer layer 1 (thickness: 90 mm) on an inner surface was erected upright, and disposed on a hollow lower mold 50 (inner diameter: 600 mm, and length: 1500 mm) for forming a driver-side shaft portion 22, and a hollow upper mold 40 (inner diameter: 600 mm, and length: 2000 mm) for forming a follower-side shaft portion 23 was disposed on the cylindrical mold 30, to constitute an assembled stationary mold 100 shown in FIG. 3(b).

Each ductile-cast-iron melt having the composition shown in Table 1 was poured into a cavity 60 of the assembled stationary mold 100 through an upper opening 43. A surface of the ductile-cast-iron melt was elevated successively through the lower mold 50 for forming the driver-side shaft portion 22, the cylindrical mold 30 (outer layer 1) for forming the roll body portion 21 and the upper mold 40 for forming the follower-side shaft portion 23. Thus formed in the outer layer 1 was an integral inner layer 2 comprising the driver-side shaft portion 22, the roll body portion 21 and the follower-side shaft portion 23.

After the inner layer 2 was completely solidified, the stationary mold 100 was dissassembled to take out the resultant composite roll, which was tempered at 500° C. Thereafter, the outer layer 1, the driver-side shaft portion 22 and the follower-side shaft portion 23 were machined to predetermined shapes, to form a clutch portion 24 and a projection 25. Ultrasonic inspection confirmed that in each composite roll thus obtained, the outer layer 1 was well fused to the inner layer 2.

Example 4

A composite roll was formed in the same manner as in Example 1, except that the cylindrical mold 30 was erected upright, after an intermediate layer (thickness: 20 mm) having the composition shown in Table 1 was formed on an inner surface of the outer layer 1. Ultrasonic inspection confirmed that the outer layer 1 was well fused to the inner layer 2 via the intermediate layer.

With respect to Examples 1-4, and Comparative Example 1 and 2, the casting temperatures of the outer layer, the inner layer and the intermediate layer, and the average elevating speed of an inner layer melt surface in the lower mold 50 for the driver-side shaft portion 22, the cylindrical mold 30 for the roll body portion 21 and the upper mold 40 for the follower-side shaft portion 23 are shown in Table 2. The average elevating speed of the inner layer melt surface was determined from the measured weight of the inner layer melt and the measured casting time. Also, with respect to each sample cut out of an end surface portion 24a of the driver-side shaft portion 22 and an end surface portion 25a of the follower-side shaft portion 23, the amounts of Cr, Mo, V and Nb were analyzed. The results are shown in Table 3. Further, a photomicrograph of a sample cut out of each outer layer 1 was image-analyzed to measure an area ratio of graphite in the metal structure. The results are shown in Table 4.

Each composite roll of Examples 1-4 and Comparative Examples 1 and 2 was used in a final finishing stand in a hot strip mill for 250,000-ton rolling of ordinary steel, to evaluate the attrition resistance of the clutch portion 24 by the following standard. The results are shown in Table 4.

Good: The clutch portion had good attrition resistance.
Poor: The clutch portion was too worn to continue using the composite roll.

TABLE 1

| No. | Layer | Chemical Composition (% by mass)[1] | | | | | | | | |
|---|---|---|---|---|---|---|---|---|---|---|
| | | C | Si | Mn | Ni | Cr | Mo | W | V | Nb |
| Example 1 | Outer Layer | 3.18 | 2.15 | 0.65 | 3.92 | 1.02 | 3.21 | — | 3.21 | — |
| | Inner Layer | 3.28 | 2.57 | 0.45 | 0.70 | 0.09 | 0.09 | — | 0.05 | — |
| Example 2 | Outer Layer | 3.39 | 2.46 | 0.62 | 4.12 | 1.79 | 1.58 | — | 2.19 | 0.54 |
| | Inner Layer | 3.30 | 2.42 | 0.51 | 0.92 | 0.16 | 0.13 | — | 0.09 | — |
| Example 3 | Outer Layer | 3.49 | 2.31 | 0.77 | 4.36 | 2.74 | 3.06 | 0.51 | 4.90 | 0.32 |
| | Inner Layer | 3.27 | 2.75 | 0.45 | 1.24 | 0.18 | 0.11 | — | 0.10 | — |
| Example 4 | Outer Layer | 3.23 | 2.34 | 0.77 | 4.25 | 0.82 | 4.45 | — | 3.66 | 0.30 |
| | Intermediate Layer | 3.20 | 1.34 | 0.67 | 3.78 | 0.35 | 1.52 | — | 0.20 | — |
| | Inner Layer | 3.35 | 2.68 | 0.42 | 0.67 | 0.14 | 0.08 | — | 0.06 | — |
| Comparative Example 1 | Outer Layer | 3.34 | 1.74 | 0.80 | 4.08 | 1.80 | 2.73 | — | 3.19 | — |
| | Inner Layer | 3.38 | 2.64 | 0.62 | 0.52 | 0.17 | 0.07 | — | 0.14 | — |
| Comparative Example 2 | Outer Layer | 3.21 | 2.39 | 0.63 | 4.48 | 2.20 | 3.25 | 0.12 | 3.97 | 0.92 |
| | Inner Layer | 3.31 | 2.63 | 0.44 | 0.71 | 0.07 | 0.08 | — | 0.07 | — |

Note:
[1]The balance are Fe and inevitable impurities in each chemical composition.

TABLE 2

| No. | Layer | Casting Temperature (° C.) | Average Elevating Speed of Inner Layer Melt Surface (mm/second) | | | |
|---|---|---|---|---|---|---|
| | | | Lower Mold | Cylindrical Mold | Upper Mold | Difference[1] |
| Example 1 | Outer Layer | 1290 | — | — | — | — |
| | Inner Layer | 1430 | 200 | 195 | 40 | 155 |
| Example 2 | Outer Layer | 1263 | — | — | — | — |
| | Inner Layer | 1405 | 180 | 175 | 50 | 125 |
| Example 3 | Outer Layer | 1285 | — | — | — | — |
| | Inner Layer | 1447 | 180 | 175 | 50 | 125 |
| Example 4 | Outer Layer | 1298 | — | — | — | — |
| | Intermediate Layer | 1371 | — | — | — | — |
| | Inner Layer | 1425 | 180 | 175 | 50 | 125 |
| Comparative Example 1 | Outer Layer | 1286 | — | — | — | — |
| | Inner Layer | 1418 | 200 | 170 | 130 | 40 |
| Comparative Example 2 | Outer Layer | 1284 | — | — | — | — |
| | Inner Layer | 1432 | 190 | 190 | 150 | 40 |

Note:
[1]Difference in an average elevating speed between a melt surface in the upper mold and a melt surface in the cylindrical mold.

TABLE 3

| No. | Shaft Portion | Distribution of Carbide-Forming Elements (% by mass) | | | | | |
|---|---|---|---|---|---|---|---|
| | | Cr | Mo | W | V | Nb | Total[1] |
| Example 1 | Shaft Portion 22 | 0.19 | 0.41 | — | 0.37 | — | 0.97 |
| | Shaft Portion 23 | 0.12 | 0.17 | — | 0.13 | — | 0.42 |
| | Difference[2] | 0.07 | 0.24 | — | 0.24 | — | 0.55 |
| Example 2 | Shaft Portion 22 | 0.39 | 0.34 | — | 0.37 | 0.08 | 1.18 |
| | Shaft Portion 23 | 0.20 | 0.17 | — | 0.14 | 0.02 | 0.53 |
| | Difference[2] | 0.19 | 0.17 | — | 0.23 | 0.06 | 0.65 |
| Example 3 | Shaft Portion 22 | 0.45 | 0.42 | 0.06 | 0.59 | 0.04 | 1.50 |
| | Shaft Portion 23 | 0.37 | 0.32 | 0.04 | 0.44 | 0.03 | 1.16 |
| | Difference[2] | 0.08 | 0.10 | 0.02 | 0.15 | 0.01 | 0.34 |
| Example 4 | Shaft Portion 22 | 0.19 | 0.35 | — | 0.28 | 0.02 | 0.84 |
| | Shaft Portion 23 | 0.15 | 0.13 | — | 0.10 | 0.01 | 0.39 |
| | Difference[2] | 0.04 | 0.22 | — | 0.18 | 0.01 | 0.45 |
| Comparative Example 1 | Shaft Portion 22 | 0.35 | 0.34 | — | 0.46 | — | 1.15 |
| | Shaft Portion 23 | 0.31 | 0.29 | — | 0.40 | — | 1.00 |
| | Difference[2] | 0.04 | 0.05 | — | 0.06 | — | 0.15 |
| Comparative Example 2 | Shaft Portion 22 | 0.36 | 0.50 | 0.02 | 0.59 | 0.12 | 1.57 |
| | Shaft Portion 23 | 0.32 | 0.45 | 0.02 | 0.53 | 0.11 | 1.41 |
| | Difference[2] | 0.04 | 0.05 | 0.00 | 0.06 | 0.01 | 0.16 |

Note:
[1] The total amount of Cr, Mo, V and Nb (% by mass).
[2] A value obtained by subtracting the amount of each element in an end portion of the shaft portion 23 from the amount of each element in an end portion of the shaft portion 22 (% by mass).

TABLE 4

| | Evaluation of Composite Roll | |
|---|---|---|
| No. | Area Ratio of Graphite in Outer Layer (%) | Attrition Resistance of Clutch Portion |
| Example 1 | 4.4 | Good |
| Example 2 | 7.5 | Good |
| Example 3 | 3.6 | Good |
| Example 4 | 1.5 | Good |
| Com. Ex. 1 | 1.6 | Good |
| Com. Ex. 2 | 4.2 | Poor |

In Examples 1-4, the elevating speed of a ductile-cast-iron melt surface in the upper mold 40 for forming the follower-side shaft portion 23 was 100 mm/second or less, lower than those in the lower mold 50 for forming the driver-side shaft portion 22 and in the cylindrical mold 30 (outer layer 1) for forming the roll body portion 21. Accordingly, the total amount of Cr, Mo, V and Nb in an end portion of the driver-side shaft portion 22 and the total amount of Cr, Mo, V and Nb in an end portion of the follower-side shaft portion 23 were both in a range of 0.15-2.0% by mass, the former being more than the latter by 0.2% or more by mass.

In Comparative Examples 1 and 2, however, the elevating speed of a ductile-cast-iron melt surface in the upper mold 40 was more than 100 mm/second, and lower than those in the lower mold 50 and in the cylindrical mold 30 (outer layer 1). Accordingly, the total amount of Cr, Mo, V and Nb in an end portion of the driver-side shaft portion 22 and the total amount of Cr, Mo, V and Nb in an end portion of the follower-side shaft portion 23 were both in a range of 0.15-2.0% by mass, but their difference was less than 0.2% by mass.

The comparison of Example 2 and Comparative Example 1 both having a close total amount of Cr, Mo, V and Nb in an end portion of the driver-side shaft portion 22 revealed that there was larger difference in the total amount of Cr, Mo, V and Nb between an end portion of the driver-side shaft portion 22 and an end portion of the follower-side shaft portion 23 in Example 2 than in Comparative Example 1. Both had sufficient hardness in the clutch portion 24 of the driver-side shaft portion 22. However, the follower-side shaft portion 23 of Comparative Example 1 with large amounts of Cr, Mo, V and Nb transferred was very hard, resulting in drastically long machining time, though the follower-side shaft portion 23 of Example 2 with suppressed amounts of Cr, Mo, V and Nb transferred had good machinability.

Likewise, the comparison of Example 3 and Comparative Example 2 both having a close total amount of Cr, Mo, V and Nb in an end portion of the driver-side shaft portion 22 revealed that though both had sufficient hardness in the clutch portion 24 of the driver-side shaft portion 22, the follower-side shaft portion 23 of Example 3 had good machinability, while the follower-side shaft portion 23 of Comparative Example 2 was hard, resulting in drastically long machining time.

Effects of the Invention

Because Cr, Mo and V, or Cr, Mo, V and Nb in the outer layer are transferred more into a driver-side shaft portion having a clutch portion than into a follower-side shaft portion in the centrifugally cast composite roll of the present invention, the driver-side shaft portion is sufficiently hard with excellent attrition resistance, and the follower-side shaft portion is not too hard, resulting in easy machining. Accordingly, the centrifugally cast composite roll of the present invention has a drastically improved durable life and good machinability. Because the centrifugally cast composite roll of the present invention with such feature can be obtained by controlling the elevating speed of a melt surface for the inner layer cast after the formation of the outer layer, its production method is efficient, contributing to the drastic reduction of the production cost of the centrifugally cast composite roll.

What is claimed is:

1. A centrifugally cast composite roll comprising an outer layer formed by a centrifugal casting method, and an inner layer made of ductile cast iron and integrally fused to said outer layer;
said outer layer being made of an Fe-based alloy having a chemical composition comprising by mass at least 0.8-3.0% of Cr, 1.5-6.0% of Mo, and 1.8-5.5% of V, and a metal structure in which the area ratio of graphite is 0.3-10%;
said inner layer comprising a roll body portion fused to said outer layer, and shaft portions integrally extending from both ends of said roll body portion; and
the total amount of Cr, Mo and V being 0.15-2.0% by mass in end portions of both shaft portions, and the difference in the total amount of Cr, Mo and V between one shaft portion and the other shaft portion being 0.2% or more by mass.

2. The centrifugally cast composite roll according to claim 1, wherein said outer layer further comprises by mass 2.5-3.7% of C, 1.2-3.0% of Si, 0.2-1.5% of Mn, and 3.0-5.0% of Ni.

3. The centrifugally cast composite roll according to claim 1, wherein said outer layer further comprises by mass at least one of 0.1-5.0% of W, 0.003-5.0% of Ti, 0.001-0.5% of B, 0.01-2.0% of Al, 0.01-0.5% of Zr, and 0.1-10% of Co.

4. A centrifugally cast composite roll comprising an outer layer formed by a centrifugal casting method, and an inner layer made of ductile cast iron and integrally fused to said outer layer;

said outer layer being made of an Fe-based alloy having a chemical composition comprising by mass at least 0.8-3.0% of Cr, 1.5-6.0% of Mo, and 1.8-5.5% in total of V and Nb, and a metal structure in which the area ratio of graphite is 0.3-10%;

said inner layer comprising a roll body portion fused to said outer layer, and shaft portions integrally extending from both ends of said roll body portion; and the total amount of Cr, Mo, V and Nb being 0.15-2.0% by mass in end portions of both shaft portions, and the difference in the total amount of Cr, Mo, V and Nb between one shaft portion and the other shaft portion being 0.2% or more by mass.

5. The centrifugally cast composite roll according to claim 4, wherein said outer layer further comprises by mass 2.5-3.7% of C, 1.2-3.0% of Si, 0.2-1.5% of Mn, and 3.0-5.0% of Ni.

6. A method for producing a centrifugally cast composite roll comprising an outer layer formed by a centrifugal casting method, and an inner layer made of ductile cast iron and integrally fused to said outer layer;

said outer layer being made of an Fe-based alloy having a chemical composition comprising by mass at least 0.8-3.0% of Cr, 1.5-6.0% of Mo, and 1.8-5.5% of V, and a metal structure in which the area ratio of graphite is 0.3-10%;

said inner layer comprising a roll body portion fused to said outer layer, and shaft portions integrally extending from both ends of said roll body portion; and the total amount of Cr, Mo and V being 0.15-2.0% by mass in end portions of both shaft portions, and the difference in the total amount of Cr, Mo and V between one shaft portion and the other shaft portion being 0.2% or more by mass;

the method comprising the steps of (1) centrifugally casting said outer layer in a rotating, centrifugal-casting, cylindrical mold; (2) erecting said cylindrical mold containing said outer layer upright, and attaching upper and lower molds communicating with said outer layer to upper and lower ends of said cylindrical mold to constitute an assembled stationary mold; and (3) casting a melt for said inner layer into a cavity defined by said upper mold, said outer layer and said lower mold; the elevating speed of a melt surface in said upper mold being 100 mm/second or less, smaller than the elevating speed of a melt surface in said lower mold and said outer layer.

* * * * *